A. W. Rahn,
Pen.

No. 380. Reissued July 22 1856.

UNITED STATES PATENT OFFICE.

ADAM W. RAPP, OF PHILADELPHIA, PENNSYLVANIA.

IMPROVED METALLIC PEN.

Specification forming part of Letters Patent No. 8,641, dated January 6, 1852; Reissue No. 380, dated July 22, 1856.

*To all whom it may concern:*

Be it known that I, ADAM WM. RAPP, of the city and county of Philadelphia, and State of Pennsylvania, have invented a new and useful Improvement in Making or Manufacturing Metallic Pens; and I do hereby declare that the following is a full and clear description thereof, reference being had to the annexed drawings, making part of this specification, in which—

Figure 3:
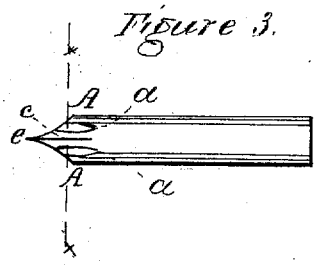
Figure 1:
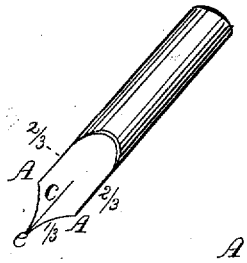
Figure 4:
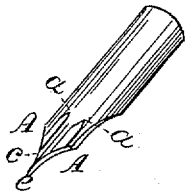
Figure 2:
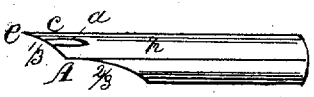
Figure 5:
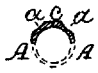

Figure 1 represents a perspective view of the pen without the staff or holder, exhibiting the interior of the pen. Fig. 2 is a side view of same. Fig. 3 is a back view of same. Fig. 4 is a perspective of the reduced portion of the nib and part of the body. Fig. 5 is a transverse section on the line *x x* of Fig. 3.

The same letters of reference indicate the same parts.

I am aware that pens have been made with openings between the shoulder and the split, in order to produce an elasticity and ease in their use; but this is defective in many respects, producing an irregular elasticity, becoming clogged with ink, easy to be broken by undue pressure, and spatters the ink when writing. Pens have also been made with a rigid concave swelling at the back and uniting with the split; but the use of this form of pen is attended with the same disadvantages, and is alike wanting in producing that uniformity of elasticity and durability so long sought after. To remedy these defects and reduce the cost of gold pens, experience has suggested to me a more efficient improvement, which forms a desideratum. It consists in reducing or thinning the sides of the pen at *a*, between the shoulders A and the split *c*, and making the split about one-half less in length than that of other pens, the reducing or paring away of the metal commencing a little above the termination of the split *c*, and uniting with the curve between the shoulder A and the nib or point *e*, and being slightly oval in its form. The results of this improvement are economy, a regular and easy elasticity which secures a uniform flow of the ink, and a perfect prevention of spattering, the elasticity being confined to the sides of the split. By this improvement the metallic pen is made to embrace all the qualities of the quill-pen, and in this I consider lies a superiority of my improvement over all others; but a prominent advantage is in the saving of gold by the reduction of the thickness at *a* when that metal is used. Therefore,

What I claim as my invention, and desire to secure by Letters Patent, is—

Reducing or thinning the sides of the pen at *a*, between the shoulder A and split *c*, whereby the advantages above stated are freely attained and the metallic pen made to possess the qualities of the quill pen.

In testimony whereof I have hereunto set my hand before two subscribing witnesses.

A. WM. RAPP.

Witnesses:

CHARLES D. FREEMAN,
ROBERT TAYLOR.